United States Patent
Brenes et al.

(10) Patent No.: US 7,596,124 B2
(45) Date of Patent: Sep. 29, 2009

(54) INTEGRATION OF AN ANALOG PHONE WITH UNLICENSED MOBILE ACCESS/GLOBAL SYSTEM FOR MOBILE COMMUNICATIONS FUNCTIONALITY

(75) Inventors: Manrique Brenes, Corona Del Mar, CA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 354 days.

(21) Appl. No.: 11/193,187

(22) Filed: Jul. 29, 2005

(65) Prior Publication Data
US 2007/0053329 A1 Mar. 8, 2007

(51) Int. Cl.
*H04Q 7/24* (2006.01)
(52) U.S. Cl. ........................ 370/338; 370/328
(58) Field of Classification Search ............ 370/328, 370/338, 310, 230; 455/426.2, 428, 553.1, 455/552.1, 442, 558
See application file for complete search history.

(56) References Cited

U.S. PATENT DOCUMENTS

| | | | | |
|---|---|---|---|---|
| 7,200,383 | B2 * | 4/2007 | Eronen | 455/411 |
| 7,277,724 | B2 * | 10/2007 | Jones et al. | 455/553.1 |
| 2004/0192211 | A1 * | 9/2004 | Gallagher et al. | 455/67.11 |
| 2004/0219948 | A1 * | 11/2004 | Jones et al. | 455/552.1 |
| 2005/0265279 | A1 * | 12/2005 | Markovic et al. | 370/328 |
| 2006/0099935 | A1 * | 5/2006 | Gallagher et al. | 455/414.1 |
| 2006/0105810 | A1 * | 5/2006 | Gnuschke | 455/558 |
| 2006/0270411 | A1 * | 11/2006 | Grayson | 455/444 |
| 2007/0008885 | A1 * | 1/2007 | Bonner | 370/230 |

* cited by examiner

*Primary Examiner*—CongVan Tran
(74) *Attorney, Agent, or Firm*—Haynes and Boone, LLP.

(57) ABSTRACT

In one embodiment, a UMA-integrated device includes at least one cellular UMA integrated circuit supporting the UMA Up architecture from the IP transport layer and higher; a router integrated circuit coupled to at least one cellular UMA integrated circuit through an Ethernet link; and an analog telephone adapter (ATA) logic circuit configured to couple the cellular UMA integrated circuit to an analog telephone.

8 Claims, 6 Drawing Sheets

INTEGRATION OF AN ANALOG PHONE WITH UNLICENSED MOBILE ACCESS/GLOBAL SYSTEM FOR MOBILE COMMUNICATIONS FUNCTIONALITY

TECHNICAL FIELD

The present invention relates generally to network applications and, more particularly, to an Unlicensed Mobile Access—Global System for Mobile Communication (UMA-GSM) analog telephone adaptor.

BACKGROUND

Cell phone coverage is not universal in that cell phone towers are concentrated in urban areas and also along major thoroughfares. Thus, a user is often without cell phone service when at home in certain suburban and rural areas. But virtually all homes are capable of broadband connections through DSL or cable modems. Unlicensed Mobile Access—Global System for Mobile Communication (UMA-GSM) dual mode phones take advantage of these broadband connections by allowing a user to access the GSM network through a wired broadband connection via a wireless access point (AP).

An exemplary UMA dual mode phone 100 is illustrated in FIG. 1. As would be the case for any conventional GSM-enabled handset, phone 100 can place calls through a cellular radio access network 110. In this regard, phone 100 would communicate with a base station 115 through a private network 120 to a base station controller 120. Base station controller 120 routes the call to a core mobile telephone network 130. In contrast, however, to a conventional GSM handset, phone 100 can also communicate through an unlicensed mobile access network 140 using a wireless access point (AP) 150. AP 150 may be configured as an IEEE 802.11 AP, a Bluetooth AP, or with any other suitable Internet Protocol (IP)-based wireless protocol. AP 150 connects through Internet 160 to a UMA network controller (UNC) 170 that in turn also couples to core mobile telephone network 130. Whether a call (carrying either voice or data or both) is placed on cellular radio access network 110 or unlicensed mobile access network 140 is entirely transparent to the user. Indeed, a caller may roam from cellular to IP coverage (or vice versa) without any discernible service interruption.

The UMA architecture is thus a well-developed VoIP technology. It has not been exploited, however, for integration into analog telephone adaptors (ATAs) because of its considerable license fees and complexity. Accordingly, there is a need in the art for low-cost and improved UMA ATA solutions.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1:
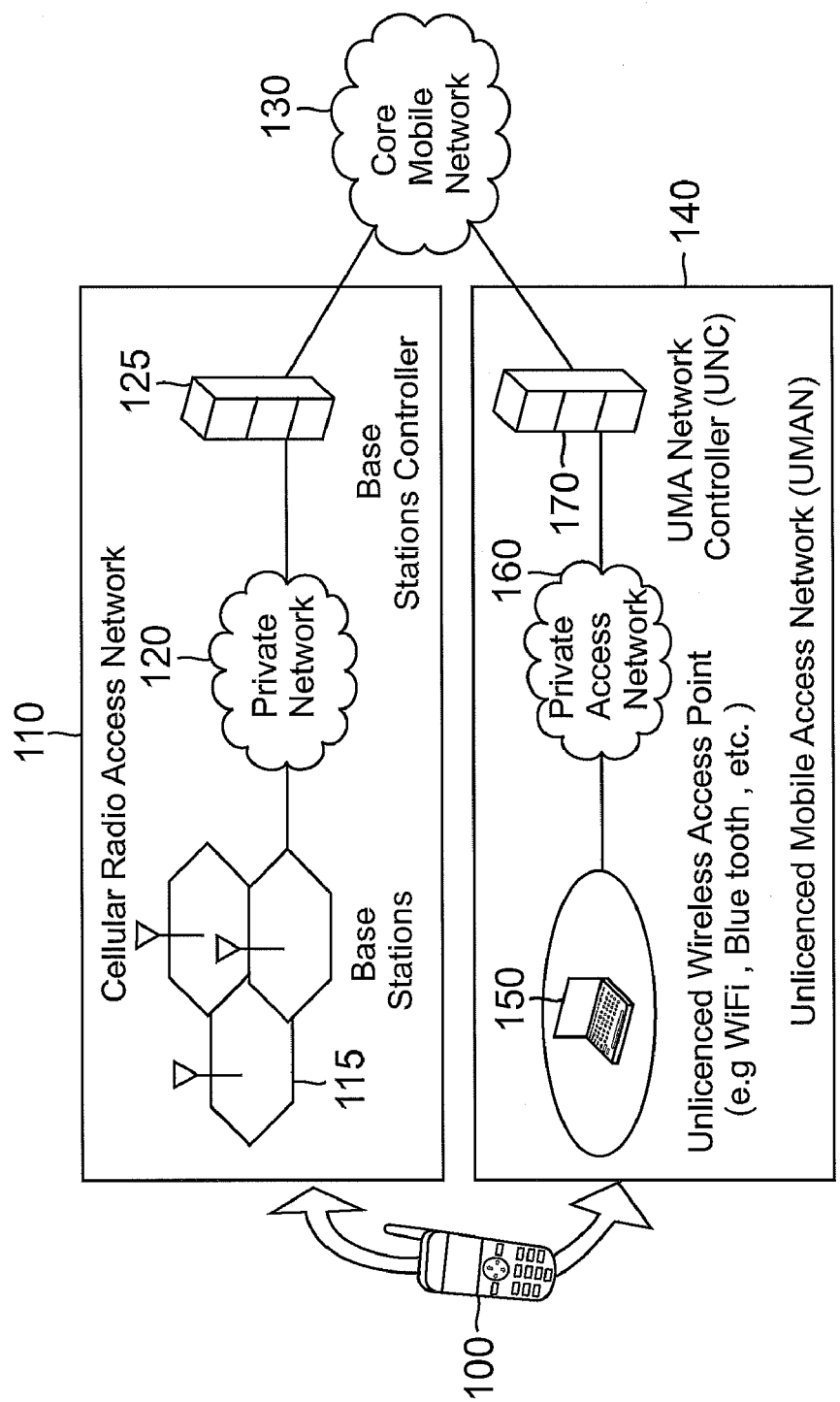
FIG. 1 is a block diagram illustrating a conventional UMA-GSM-enabled handset accessing a mobile telephone network through either a cellular or an IP connection.

As discussed earlier, a UMA dual mode phone such as phone 100 of FIG. 1 may place calls either through an IP-based network 160 or through a traditional GSM cellular network 120. Thus, a UMA adapter for an analog telephone could be configured to access either network. However, as discussed earlier, a home user typically has spotty or unreliable cellular coverage. In contrast, virtually all homes have broadband access, either through a DSL connection or a cable modem. Thus, the following discussion of a UMA adapter will consider only IP-based access. As most home users will tend to have a router or residential gateway so that they may network multiple devices to their broadband connection, the following discussion will also concentrate upon a UMA-integrated router embodiment. However, should a user desire to dedicate their broadband connection to a UMA analog telephone adapter (ATA) application, some of the layer 3 (L3) functionality of a router would be superfluous. Thus, it will be appreciated that the layer 3 functionality of the UMA-integrated routers described herein is optional.

Figure 2:
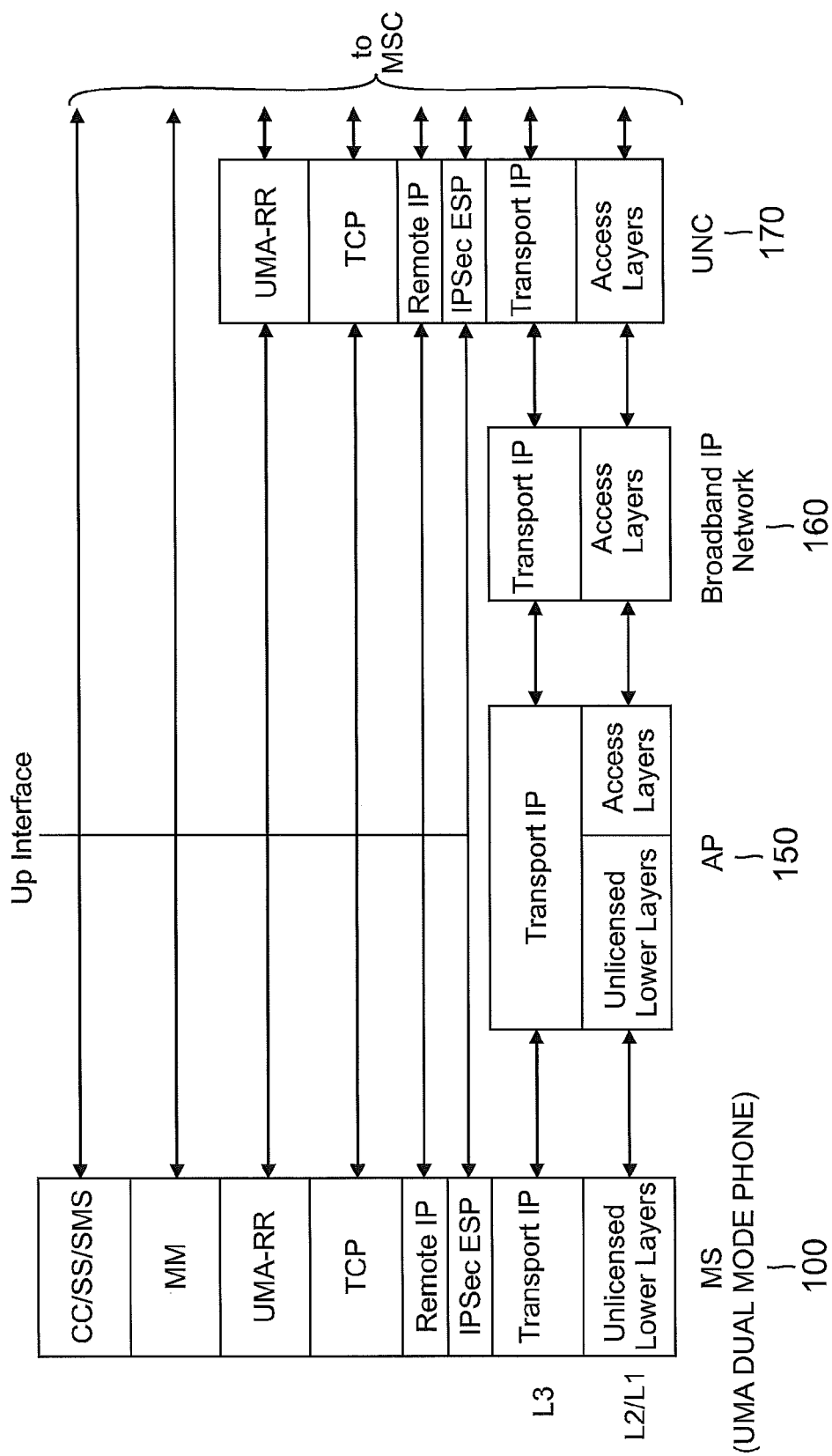
FIG. 2 illustrates a conventional signaling UMA Up architecture.

The development and mass production (and the resulting economies of scale) of conventional UMA integrated circuits for cellular handsets may be leveraged by the incorporation of such circuits into a UMA-integrated router as discussed further herein. The integration of such circuits into a UMA-integrated router may be better understood with regard to the Up interface for a UMA dual mode mobile station as specified in the UMA Architecture specification (Stage 2) R1.0.1 (Oct. 8, 2004). The Up interface is the interface the between UNC 170 of FIG. 1 and UMA dual mode phone (mobile station) 100. This interface exists for voice traffic, data traffic, and out-of-band signaling. For example, FIG. 2 illustrates the signaling UMA Up protocol architecture. UMA dual mode phone 100 communicates on the physical layer L1 with an AP 150 using the unlicensed mobile access network 140 of FIG. 1. Similarly, AP 150 uses the access layers (L1 and L2) to communicate with IP access network 160. In turn, AP 150 uses its access layers to communicate with UNC 170. The remaining connections in the higher levels are "logical connections" in that the actual communication occurs only on the physical layer L1. For example, a logical connection exists between the transport IP layers in UMA dual mode phone 100 and AP 150. Similarly, a logical connection exists between the IP Encapsulating Security Payload (IPSec ESP) layer, Remote IP layer, Transmission Control Protocol. (TCP) layer and UMA Radio Resource (RR) layer of UMA dual mode phone 100 and UNC 170. Finally, a logical connection exists between the GSM Mobility Management (MM) layer and the Call Control/Supplementary Services/Short Message Service (CC/SS/SMS) layer of UMA dual mode phone 100 and a GSM Mobile Switching Center (MSC) (not illustrated).

Figure 3:
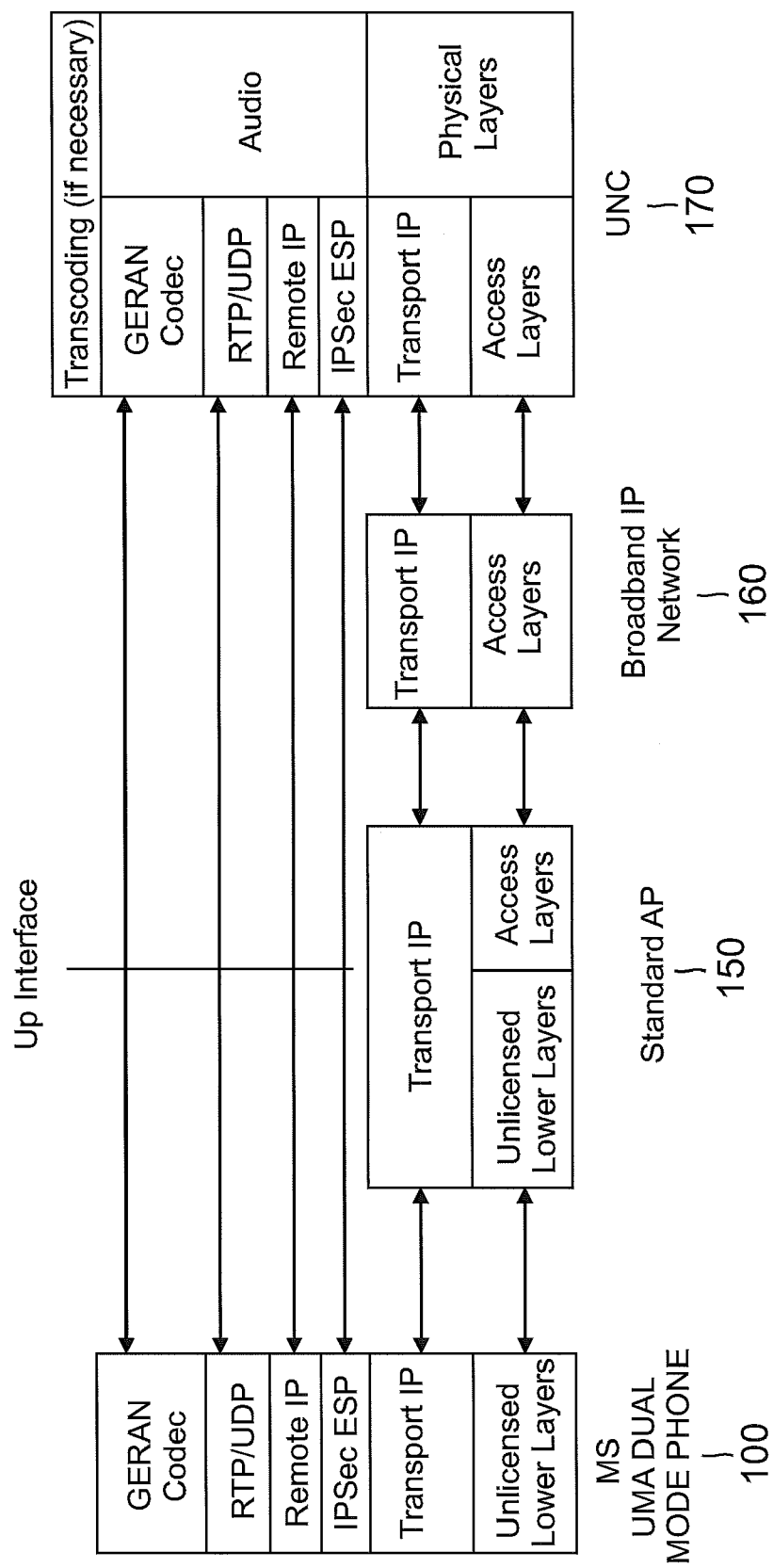
FIG. 3 illustrates a conventional voice UMA Up architecture.

FIG. 3 illustrates the voice UMA Up protocol architecture. From the Remote IP layer and lower, the architecture is as discussed with regard to FIG. 2. However, above the Remote IP layer in UMA dual mode phone 100 is a Real-time Transport Protocol/User Datagram Protocol (RTP/UDP) layer. Above this layer is the GERAN Coder/Decoder (CODEC) layer. A logical connection exists between these layers and corresponding layers in UNC 170.

Figure 4:
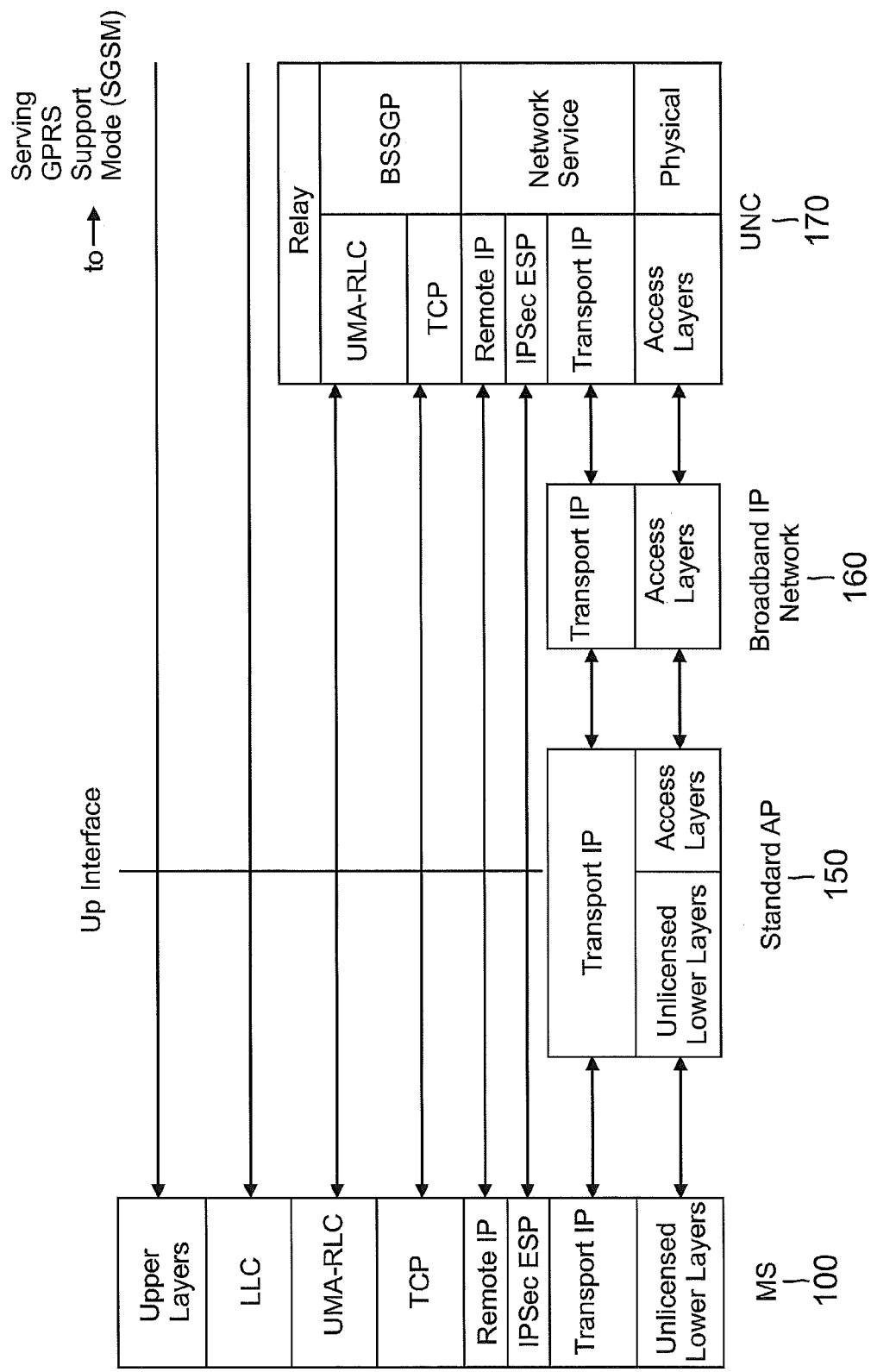
FIG. 4 illustrates a conventional data signaling UMA Up architecture.

FIG. 4 illustrates the General Packet Radio Service (GPRS) signaling UMA Up protocol architecture (the data signaling architecture). At the TCP layer and lower, the communication between phone 100 and UNC 170 is as discussed with respect to the signaling architecture of FIG. 2. Above the TCP layer in phone 100 is the UMA Radio Link Control (RLC) layer, which has a logical connection with the corresponding layer in UNC 170. Above the UMA-RLC layer is the Logical Link Control (LLC) layer and upper layers, which have logical connections with the corresponding layers in a Serving GPRS Support Node (SGSN) (not illustrated).

Figure 5:
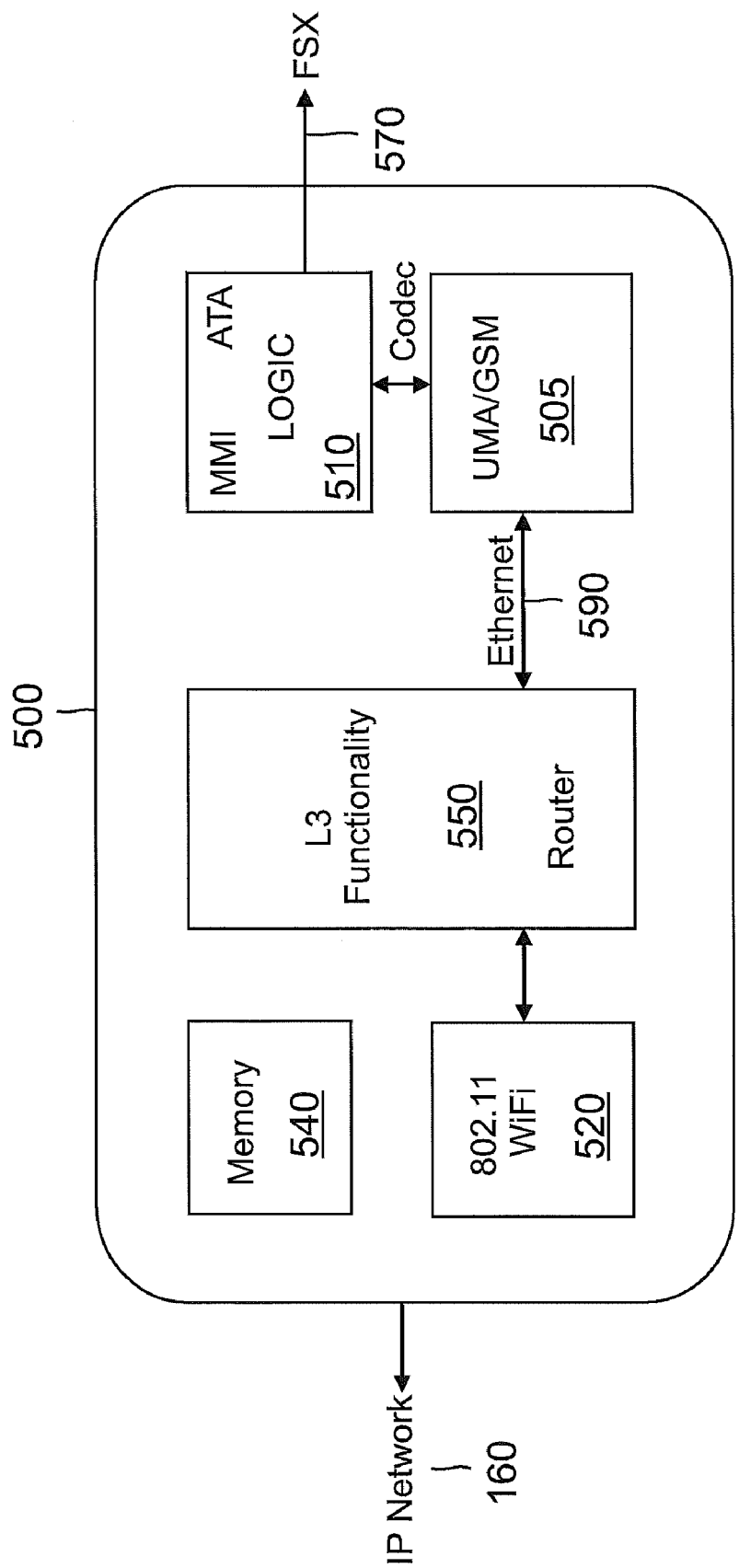
FIG. 5 is a block diagram of a UMA-integrated router including a cellular UMA integrated circuit in accordance with an embodiment of the invention.

The relationship between the UMA Up architecture and an exemplary UMA-integrated router 500 as illustrated in FIG. 5 will now be described. In this embodiment, router 500 functions as an AP for a wireless network (not illustrated). For example, router 500 may include an IEEE 802.11 "WiFi" radio 520. Radio 520 would thus include a media access control baseband (MAC/BB) processor configured to practice, for example, the 802.11g, 802.11e, or 802.11i protocols. Router 500 may be modified, however, for inclusion within wired networks such as Ethernet-based networks. A router integrated circuit 550 provides the L3 functionality to route calls through IP access network 160 as discussed with respect to FIG. 1. Buffering and other necessary memory functions for router 200 are supported by a memory 240.

Figure 6:
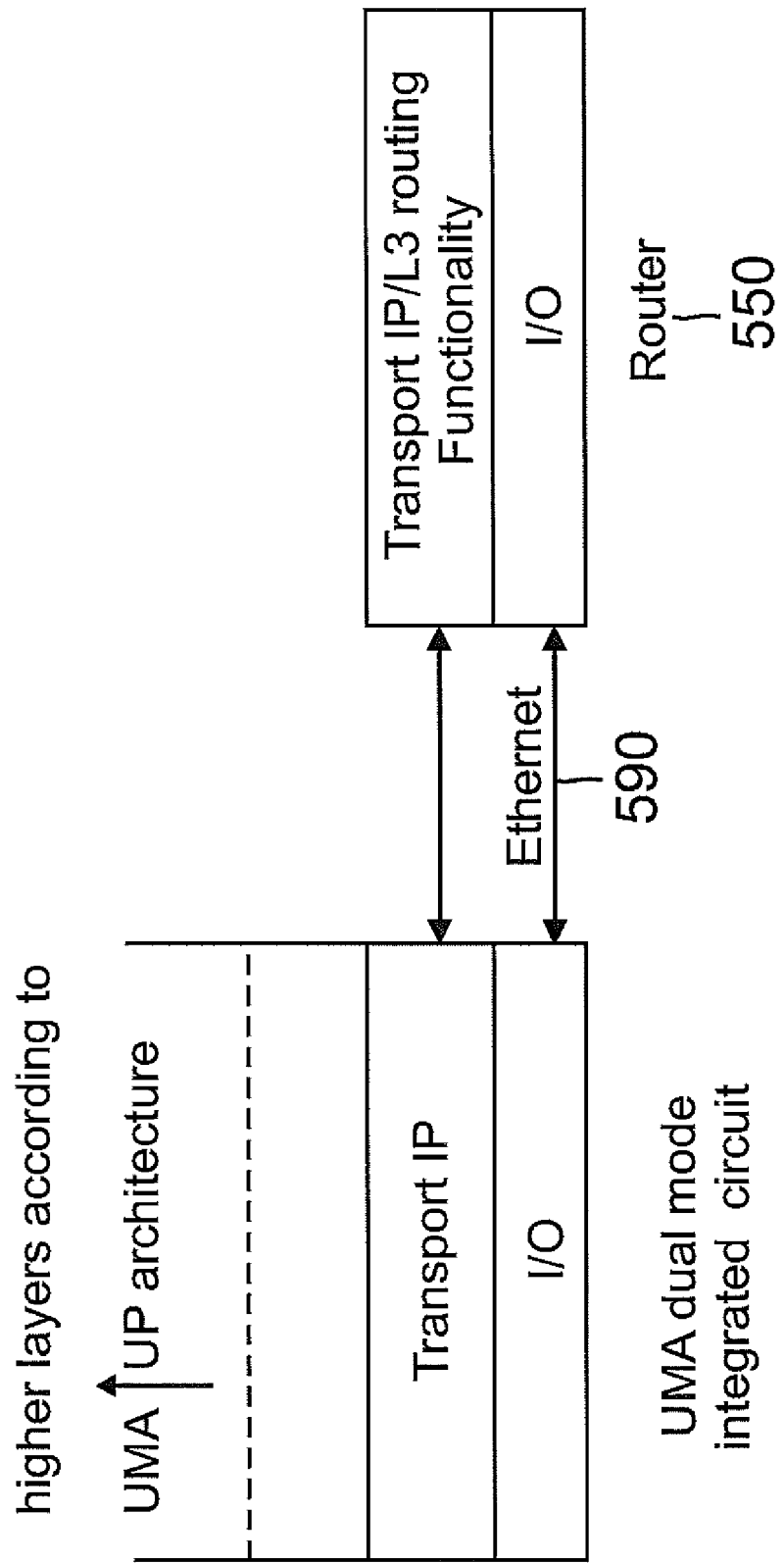
FIG. 6 illustrates a UMA Up architecture for router of FIG. 5.

Router 500 includes one or more cellular UMA integrated circuits 505 supporting the UMA Up architecture for speech, data, and signaling. However, rather than communicate with an AP using an unlicensed physical layer radio link as discussed with respect to FIGS. 2 through 4, the UMA Up architecture is modified as shown in FIG. 6. FIG. 6 is generic to the speech, data, and signaling architectures in that from the Transport IP layer and higher, the UMA dual mode integrated circuit 505 functions as it would in a UMA dual mode phone 100 of FIGS. 2 through 4. In a phone implementation, integrated circuit 505 associates with a WiFi and a GSM radio to communicate on the physical layer. However, in router 500, integrated circuit 505 is coupled through a port 590 to router integrated circuit 505. Thus, the unlicensed layers of FIGS. 2 through 4 is replaced by an I/O layer, which may represent the Ethernet physical layer. Advantageously, no modification need be made to the UMA cellular integrated circuit 505— whereas in a UMA dual mode phone implementation, integrated circuit 505 would be transmitting and receiving IP-based signals to the baseband processors for the WiFi and GSM radios, these IP-based signals are instead presented to an Ethernet port of router integrated circuit 550. Because router integrated circuit 550 is sending and receiving these IP-based signals on a defined physical link, the corresponding signals may be given a higher priority via the router's L3 functionality as compared to other IP-based signals from surrounding nodes in the user network supported by router 500. In this fashion, a satisfactory QoS may be provided to UMA calls by router 500.

Because UMA cellular integrated circuit 505 need be unmodified from a UMA dual mode phone implementation, it will support an access mode layer that determines whether access to core mobile network 130 of FIG. 1 should occur through cellular network 110 or unlicensed mobile access (IP-based) network 140. However, because cellular UMA integrated circuit 505 is not coupled to a GSM radio as would be the case should cellular integrated circuit 205 be used in a conventional UMA dual mode handset, the access mode layer will always select for the IP-based network connection.

Since a conventional analog phone (not illustrated) requires a dial tone and other characteristics of analog telephony that are not supported by cellular UMA integrated circuit 505, router 500 includes conventional man-machine-interface (MMI) analog telephone adapter (ATA) logic 510. In this fashion a user of a conventional analog phone coupling to router 500 through a Foreign eXchange Subscriber (FXS) interface 530 will not realize they are actually communicating through a mobile phone interface. However, the dial tone they receive from ATA logic 510 is actually a simulated dial tone as is conventional in the ATA arts. ATA logic 510 may support multiple FSX ports. ATA logic 510 interfaces with the voice UMA Up architecture discussed with respect to FIG. 3 at the GERAN CODEC layer.

Note the advantages offered by router 500. A home user may subscribe to a UMA cellular provider yet place calls through a conventional analog interfaces such as telephones, fax machines, modems, etc. In this fashion, the home user has yet another VoIP option available, thereby lowering costs and increasing service. Access to IP network 160 may occur through any conventional technology such as Ethernet, xDSL, DOCSIS, Frame, or WiMAx. Moreover, because a conventional cellular UMA integrated circuit is used, it will supply the necessary coder-decoder (CODEC) functions such as adaptive multi-rate (AMR) voice coding, adaptive echo cancellation (AEC), jitter buffer, and Internet Key Encryption Version 2 (IKEv2). Router 500 may be configured with a DHCP server, Network Address Translation (NAT) capabilities, firewall protection, and other services conventional in the router and AP arts.

Although the incorporation of conventional cellular UMA integrated circuits such as described with respect to FIG. 2 takes advantage of the existing manufacture of such circuits, a custom integrated circuit approach could also be implemented. In such a custom integrated circuit approach, the unnecessary capability of accessing the GSM cellular network may be removed to save semiconductor die area. Analysis of FIGS. 2 through 4 illustrates that at the higher level protocols, the communication is transparent to a corresponding single mode GSM system. For example, the signaling architecture for a GSM system is identical to that shown in FIG. 2 at the MM layer and higher. The speech architecture for a GSM system is identical to that shown in FIG. 3 at GERAN CODEC layer and higher. Similarly, the data architecture for a GSM (GPRS) system is identical to that shown in FIG. 4 at LLC layer and higher. Thus, a conventional GSM integrated circuit that supports signaling from the MM layer and higher, speech from the GERAN CODEC layer and higher, and data from the LLC layer and higher may be ported with a custom integrated circuit that supports the UMA architecture from these levels down to the IP transport layer. This custom integrated circuit would then communicate through a physical link to router integrate circuit 550 analogously as discussed with respect to FIG. 5. Alternatively, a completely custom integrated circuit approach could be implemented, using, for example, a Session Initiation Protocol (SIP)-based design. In such a design, the access control layer of the UMA Up architecture may be modified such that it does not support GSM cellular access.

Embodiments described above illustrate but do not limit the invention. It should also be understood that numerous modifications and variations are possible in accordance with the principles of the present invention. Accordingly, the scope of the invention is defined only by the following claims.

We claim:

1. An Unlicensed Mobile Access (UMA)-integrated device, comprising:
    an at least one cellular UMA integrated circuit supporting the UMA Up architecture from the IP transport layer and higher;
    a router integrated circuit coupled to the at least one cellular UMA integrated circuit through a wired Ethernet link; and
    an analog telephone adapter (ATA) logic circuit configured to couple the cellular UMA integrated circuit to an analog telephone, arranged such that the analog telephone communicates over an unlicensed mobile access network (UMAN).

2. The device of claim 1, further comprising an 802.11-based radio coupled to the router integrated circuit such that the device functions as a wireless access point (AP).

3. The device of claim 1, further comprising an FXS interface coupled to the ATA logic circuit.

4. The device of claim 3, wherein the FXS interface comprises a plurality of FXS interfaces.

5. An Unlicensed Mobile Access (UMA)-integrated device, comprising:
    at least one UMA integrated circuit supporting the UMA Up architecture from the Transport IP layer and higher, wherein an access control layer has been modified to prevent access to a GSM cellular radio access network, the at least one UMA integrated circuit supporting a layer 3 router coupled to the UMA transport layer through a physical link, the at least one UMA integrated circuit supporting analog telephone adapter (ATA) logic that couples the UMA Up architecture to an analog telephone.

6. The device of claim 5, wherein the at least one UMA integrated circuit includes an 802.11-based radio coupled to the layer 3 router that the device functions as a wireless access point (AP).

7. The device of claim 5, further comprising an FXS interface coupled to the ATA logic.

8. The device of claim 7, wherein the FXS interface comprises a plurality of FXS interfaces.

* * * * *